United States Patent
Li et al.

(10) Patent No.: US 11,075,929 B1
(45) Date of Patent: Jul. 27, 2021

(54) MACHINE LEARNING ASSISTED ANOMALY DETECTION ON A MILLIMETER-WAVE COMMUNICATIONS NETWORK

(71) Applicant: Facebook, Inc., Menlo Park, CA (US)

(72) Inventors: Ying Li, Menlo Park, CA (US); Fan Sun, Fremont, CA (US); Guan Pang, Menlo Park, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/900,498

(22) Filed: Feb. 20, 2018

(51) Int. Cl.
| | |
|---|---|
| H04L 29/06 | (2006.01) |
| G06K 9/00 | (2006.01) |
| H04W 76/10 | (2018.01) |
| H04W 92/20 | (2009.01) |
| H04W 84/04 | (2009.01) |
| G06N 20/00 | (2019.01) |

(52) U.S. Cl.
CPC ...... *H04L 63/1425* (2013.01); *G06K 9/00536* (2013.01); *H04W 76/10* (2018.02); *H04W 84/047* (2013.01); *H04W 92/20* (2013.01); *G06N 20/00* (2019.01)

(58) Field of Classification Search
CPC .............. H04L 63/1425; H04W 76/10; H04W 84/047; H04W 92/20; G06K 9/00536
See application file for complete search history.

(56) References Cited

U.S. PATENT DOCUMENTS

| | | | |
|---|---|---|---|
| 2003/0146871 A1* | 8/2003 | Karr ........................ | G01S 1/026 342/457 |
| 2012/0020222 A1* | 1/2012 | Nishioka ............... | H04W 40/12 370/235 |
| 2017/0099226 A1* | 4/2017 | Vasseur ................. | H04L 47/826 |
| 2018/0047147 A1* | 2/2018 | Viswanathan ............ | G06T 7/70 |
| 2018/0183650 A1* | 6/2018 | Zhang ................... | G01S 13/003 |
| 2018/0204134 A1* | 7/2018 | Stewart ................ | G05B 23/024 |
| 2018/0365571 A1* | 12/2018 | Rui ........................ | G06N 20/00 |

* cited by examiner

*Primary Examiner* — Samina F Choudhry
(74) *Attorney, Agent, or Firm* — Artegis Law Group, LLP

(57) ABSTRACT

In one embodiment, a method includes accessing time series data of a wireless communication link between a first node and a second node on a millimeter-wave communications network; determining that an anomaly exists in the time series data; determining an anomaly type for the anomaly by inputting one or more features derived from the time series data into a machine learning module; generating a report comprising an indication that the anomaly exists and a description of the anomaly type, and determining one or more treatments for the determined anomaly.

20 Claims, 8 Drawing Sheets ates. In particular embodiments, one or more links 150 may

MACHINE LEARNING ASSISTED ANOMALY DETECTION ON A MILLIMETER-WAVE COMMUNICATIONS NETWORK

TECHNICAL FIELD

This disclosure generally relates to wireless communication networks.

BACKGROUND

A millimeter wave communication network may facilitate the communication of data where wired communication is unavailable, impractical, or impossible. For example, a millimeter-wave communication network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A millimeter-wave communication network may include multiple wirelessly interconnected network nodes operating at frequencies such as a 60 GHz, 28 GHz, or any other suitable frequency. A wireless connection between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the millimeter-wave communication network to the core or backbone network. A CN may communicate with DNs and CEs to connect a customer network to the millimeter-wave communication network.

A millimeter-wave communication network may include access network, where the millimeter-wave links are used to connect the user equipment (UE) and the cell. The cell could be an access point, a cellular node, etc. The cell then connects to the core network and the core (e.g., backhaul) network connects to the Internet.

SUMMARY OF PARTICULAR EMBODIMENTS

In particular embodiments, an anomaly detection system may detect anomalies that occur on a millimeter-wave communication network. Because the network operates at millimeter-wave frequency such as 60 GHz, 28 GHz, or any other suitable frequency, communication links between network nodes are susceptible to fault when a line-of-sight path between two nodes is blocked by foliage, buildings, and other structures. An anomaly may be any problem that occurs within the network, such as foliage blockage between nodes, severe weather that weakens links between nodes, interference by other communication links, or software and hardware malfunctions on the nodes themselves. The anomaly detection system may use machine learning to automatically detect and categorize anomalies on the millimeter-wave communication network. As inputs to a machine learning module, the anomaly detection system may use engineering data including the topology, configuration parameters, etc., and historical and real-time counter data from the network, based on which time series of metrics such as signal to noise ratio, pathloss, etc., of the links between network nodes. Based on the patterns and statistics of the time series, optionally, one or more other inputs (such as weather data and LIDAR data), the anomaly detection system may determine (1) that an anomaly has occurred on a particular communication link between two nodes, (2) the type of anomaly, and (3) one or more recommended treatments to mitigate or eradicate the anomaly.

DESCRIPTION OF EXAMPLE EMBODIMENTS

Figure 1:
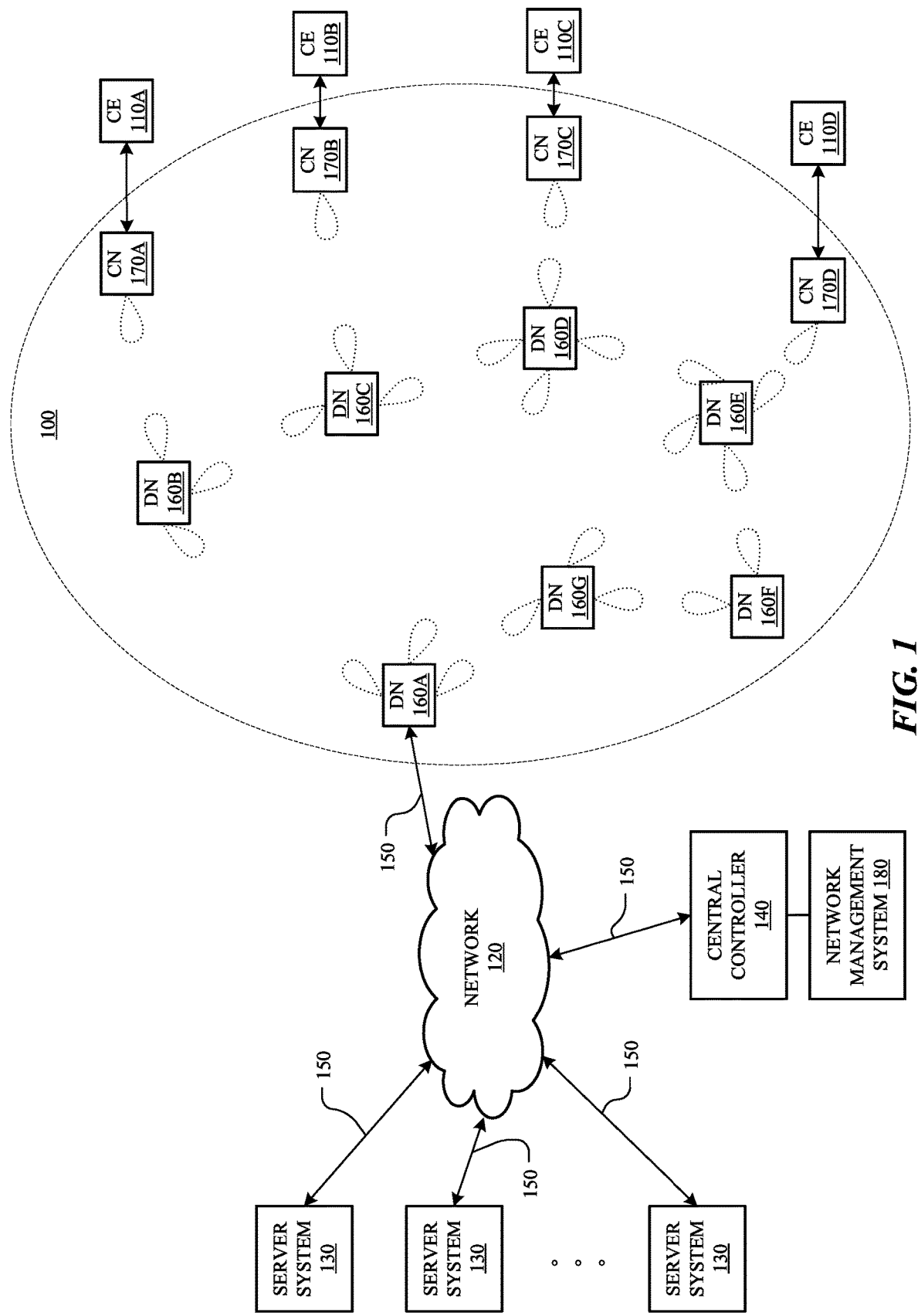
FIG. 1 illustrates an example millimeter-wave communication network.

FIG. 1 illustrates an example millimeter-wave communication network 100. In the example of FIG. 1, millimeter-wave communication network 100 connects CE 110 at customer premises (such as residences or places of businesses) to a core or backbone network 120 (which may include one or more portions of the Internet). Network 120 connects millimeter-wave communication network 100 to one or more server systems 130. Network 120 may also connect central controller 140 to millimeter-wave communication network 100. In addition or as an alternative, central controller 140 may where appropriate connect to one or more network nodes of millimeter-wave communication network 100 directly, for example, through out-of-band signaling by 2G, 3G, or 4G mobile telecommunications. Communication between central controller 140 and a network node through network 120 may be referred to as in-band. Links 150 may connect millimeter-wave communication network 100, server systems 130, and central controller 140 to network 110. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where approprieach include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of millimeter-wave communication network 100, server systems 130, or central controller 140 may be connected to each other directly, bypassing network 120. As another example, two or more of millimeter-wave communication network 100, server systems 130, or central controller 140 may be physically or logically co-located with each other in whole or in part.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for millimeter-wave communication network 100, which may include coordinating ignition of DNs 160 and CNs 170, as described below. In particular embodiments, central controller 140 may be instructed by a network management system (NMS) 180. NMS 180 may be a web application that may be used to administer the millimeter-wave communication network 100. NMS 180 may instruct central controller 140. As an example and not by way of limitation, NMS 180 may instruct central controller 140 to ignite one or more network nodes on millimeter-wave communication network 100. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to millimeter-wave communication network 100 by network 120. In addition or as an alternative, central controller 140 may where appropriate connect to one or more network nodes of millimeter-wave communication network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, millimeter-wave communication network 100 includes multiple DNs 160 and CNs 170. A DN 160 wirelessly communicates with one or more CNs 170 or one or more other DNs 160 to relay data through millimeter-wave communication network 100. DN 160A also communicates through a link 150 with one or more edge devices of network 120 to connect millimeter-wave communication network 100 to network 120, providing a point-of-presence (PoP) for millimeter-wave communication network 100 on network 120. A CN 170 communicates with one or more DNs 160 and CE 110 to connect a customer network to the millimeter-wave communication network. One or more wireline or other suitable links may connect a CN 170 to CE 110. A CE 100 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, millimeter-wave communication network 100 includes multiple DNs 160 and CNs 170. Wireless communication in millimeter-wave communication network 100 may be point-to-point, and DNs 160 and CNs 170 may communicate wirelessly with each other in one or more frequency bands at or around 60 GHz. A DN 160 or CN 170 may have a maximum range of approximately 1.5 kilometers, but may typically communicate with other DNs 160 or CNs within approximately 200-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of millimeter-wave communication network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG. 1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example millimeter-wave communication network with a particular number of particular network nodes in a particular arrangement with particular numbers of particular beamforming antenna arrays aimed in particular directions, this disclosure contemplates any suitable millimeter-wave communication network with any suitable number of any suitable network nodes in any suitable arrangement with any suitable numbers of any suitable beamforming antenna arrays aimed in any suitable directions.

To improve communication paths between network nodes, to reduce interference, and to increase the throughput of the network, DNs 16 and CNs 170 may include multiple antennas composing one or more antenna arrays that may be used to control the transmit and receive directions of the node by employing beamforming techniques, as described above. Beamforming may be used to point an antenna array at a target to reduce interference and improve communication quality. In beamforming, both the amplitude and phase of each antenna may be controlled. Combined amplitude and phase control may be used to adjust the transmit and receive signals on network nodes. As will be appreciated by those skilled in the art of radio frequency communications, the radio frequency signals transmitted by each of the antennas or antenna arrays can be selectively timed by beamforming techniques to direct the main lobe (which can comprise the bulk of the transmitted signal power) in a desired direction. Similarly, signals received by the antennas can be delayed and summed using beamforming techniques to change the effective listening direction of the receiver. In the example of FIG. 1, network nodes can beamform their transmit and receive signals in several different directions, as well as other directions. Beamform training involves a transmitting network node and a receiving network node. The transmitting network node transmits training packets in each of a number of possible transmitting directions and the receiving network node listens to determine the transmission direction with which it can best detect the transmitted packets.

Throughout the disclosure, machine learning (ML) can be interchangeable to artificial intelligence (AI). Types, classes are interchangeable; type, category, and class are interchangeable. Time series, counter, radio signal, time series of radio signal, waveform, signal waveform, are interchangeable.

In particular embodiments, an anomaly detection system may detect anomalies that occur on a millimeter-wave communication network. Because the network operates at millimeter-wave frequency such as 60 GHz, 28 GHz, etc., communication links between network nodes are susceptible to fault when a line-of-sight path between two nodes is blocked by foliage, buildings, and other structures. An anomaly may be any problem that occurs within the network, such as foliage blockage between nodes, severe weather that weakens links between nodes, interference by other communication links, or software and hardware malfunctions on the nodes themselves. The anomaly detection system may use machine learning to automatically detect and categorize anomalies on the millimeter-wave communication network. As inputs to a machine learning module, the anomaly detection system may use engineering data including the topology, configuration parameters, etc., and historical and real-time counter data from the network, based on which time series of metrics such as signal to noise ratio, pathloss, etc., of the links between network nodes. Based on the patterns and statistics of the time series, optionally, one or more other inputs (such as weather data and LIDAR data), the anomaly detection system may determine (1) that an anomaly has occurred on a particular communication link between two nodes, (2) the type of anomaly, and (3) one or more recommended treatments to mitigate or eradicate the anomaly.

The anomaly detection system may use data analytics and machine learning to automatically detect various anomalies that occur on the millimeter wave communication network. To detect anomalies automatically, machine learning algorithms can help enhance the accuracy of determining when an anomaly exists and determining a categorization for the anomaly. The anomaly detection system may enable automatic detection and treatment of anomalies, which may reduce the need for engineers to make field trips and may also lower operational costs. Furthermore, automatically detecting and eliminating anomalies may improve the reliability and speed of the millimeter-wave communication network.

In particular embodiments, the anomaly detection system may identify various types of anomalies, including key quality indicator (KQI) anomalies, key performance indicator (KPI) anomalies, hardware anomalies, software anomalies, interference anomalies, blockage anomalies or any other suitable type of anomaly. A KQI anomaly may include, for example, statistics related to the end-user's or a group of end-users' quality of experience, download speed (e.g., throughput), latency, and packet loss. A KPI anomaly may include, for example, the strength level of a signal, the interference level, and the number of active end-users. In particular embodiments, the KQI may be a mapping function of one or more relevant KPIs. The anomaly may be in the spatial dimension (e.g., at a particular geographic area), or may be a combined spatial and temporal anomaly. As an example of a spatial anomaly and not by way of limitation, a particular network node may show signs of decreased throughput at a constant rate. As an example of a spatial and temporal anomaly, a network node may show signs of decreased throughput during limited time windows. The time windows may be periodic or may be erratic. For example, the time window may be when wind speed is above 10 meters per second. Although this disclosure describes identifying particular anomalies in a particular manner, this disclosure contemplates identifying any suitable anomalies in any suitable manner.

In particular embodiments, the anomaly detection system may identify whether the anomaly is a blockage anomaly. A blockage anomaly may be due to foliage blocking a line-of-sight path between two network nodes. In particular embodiments, the anomaly detection system may classify the foliage blockage into one or more categories. The categories may be as simple as a binary indication of whether foliage exists (e.g., a 1 may correspond to foliage and a 0 may correspond to no foliage), or the categories may include a severity level of the foliage (e.g., heavy, medium, or light foliage). The categories may also include an indication of whether the foliage blockage is time-varying. As an example and not by way of limitation, a time-varying foliage blockage may indicate that the foliage is leaves that rustle into the line-of-sight path only when it is windy (e.g., wind speed above a threshold, such as 10 m/s). As another example and not by way of limitation, a time-unvarying foliage blockage may indicate that the foliage is a tree trunk that remains unmoved during wind and rain. Although this disclosure describes three classes of foliage (e.g., heavy, medium, light) this disclosure contemplates more or less than three classes. Likewise, although this disclosure describes a binary distinction between time variance (e.g., time-varying or time-unvarying), this disclosure contemplates other classes of distinction as it relates to time. For example, a class of foliage may be time-varying when wind speed is above 10 m/s and the month is between March and November. This may be because during winter months, no leaves are on the trees to block line-of-sight paths between network nodes.

In particular embodiments, classes of foliage may be detected using one or more data sets. The data sets may include map data data, time series data, human-generated data, weather data, or any other suitable data set. The map data may be 3D LIDAR data, 3D map data, or satellite data. The map data may indicate the location of trees, telephone poles, buildings, street signs, and, in particular embodiments, the network nodes themselves. The anomaly detection system may analyze the map data to identify line-of-sight paths that are or may be blocked by obstacles such as trees, poles, billboard, buildings, or any other object. In particular embodiments, the anomaly detection system may determine the height of the foliage in relation to the height of the transmitting and receiving network nodes. If their respective heights are within a threshold distance, the anomaly detection system may determine that a blockage exists between the two network nodes. In particular embodiments, the anomaly detection system may simply flag the wireless communication link between the network nodes for further examination from an additional data source, such as the radio-signal data. In this case, the anomaly detection system may scrutinize the radio-signal data for the flagged links to determine if the radio-signal data reveals an anomaly (as will be explained below). Although this disclosure describes using map data in a particular manner to identify anomalies, this disclosure contemplates using map data in any suitable manner to identify anomalies.

In particular embodiments, radio-signal data may include data collected from links on the millimeter wave communication network. The data may include counters at particular time intervals (e.g., every second). The counters may include any suitable type of data, including packet error rate, modulation and coding scheme indicators, transmission power level, signal-to-noise ratio, signal-to-interference-noise ratio, received signal strength indicator, a count of the received successful packets, a count of the received failed packets, transmission beam index indicator, receiving beam index indicator, or any other suitable data type. In particular embodiments, the human-generated data may include, for example, engineering parameters regarding links between network nodes, such as the unique identifiers for each network node, GPS locations and/or heights for the network nodes, maximum transmission power, initial configurations for the network nodes, or any other suitable type of human-generated data. In particular embodiments, weather data may include time stamps along with information about the weather in the location where each network node (or group of network nodes) are located. Information about the weather may include the rainfall during a particular time window (e.g., the preceding hour), wind during a particular time window, humidity, or any other suitable type of weather information.

In particular embodiments, once the existence of foliage and the foliage class are determined, the anomaly detection system may generate a report of the anomaly or anomalies. The report may include an indication that an anomaly exists on the millimeter wave communication network (including an identification of the wireless link affected and/or the network nodes involved in the anomaly), a description of the anomaly type, and a description of the one or more treatments that may be applied to the anomaly to remedy or eliminate the anomaly. In particular embodiments, the treatment may be an automatic action that the network management system may take without requiring human input. The treatment may include one or more of the following: fast link adaptation (e.g., lower the initial modulation and coding scheme (MCS) configuration, increase the initial transmitting power configuration, increase step sizes related to link recovery, increase the transmitting power modification step sizes, increase MCS modification step sizes, and increase the rate of link adaptation. The treatments may further include fast link recovery, such as switching to other beam pairs quickly, network topology modification (e.g., adding a new network node and moving communications to pass through the new network node), re-routing communications to avoid foliage or other sources of blockage. As an example and not by way of limitation, if a foliage blockage is heavy and time unvarying, a treatment may be to fast-switch beam pairs (e.g., re-route communication channels relatively quickly to avoid the foliage blockage), or to add or move network nodes to avoid the foliage blockage. Although this disclosure describes particular treatments to an anomaly on a millimeter wave communications network, this disclosure contemplates any suitable treatment for an anomaly on a millimeter-wave communications network. Table 1 below outlines some examples of treatments based on foliage type. Note that "Tx" is an abbreviation for transmitting node and "Rx" is an abbreviation for receiving node.

In particular embodiments, 3D LiDAR data can be used to enhance the detection of foliage vs non-foliage type blockage, if any, along the line of sight (LOS) path of tx and rx. It also provides richer information on the amount and location of each blockage type (e.g., the foliage blockage type, the non-foliage blockage type). The amount of the blockage of each type can be calculated via e.g., the total number of detected units (e.g., the LIDAR points) of the blockage of the respective type, within a certain space along the LOS path. If the 3D LiDAR data were not real-time, it may have had difficulties helping with the real-time detection of the blockage; however, as some of the blockage could be static, it could still be used to enhance the labeling of the foliage or non-foliage blockage, as well as enhance the results of the detection. In addition, foliage type blockage, or non-foliage blockage detection via 3D LiDAR data can provide richer information regarding e.g., how much the foliage is below the LOS, the location of foliage along the LOS path, etc. Such information can be accounted for in ML model for future growth or movement in extreme weather condition. In particular embodiments, the anomaly detection system may use a two-step algorithm to identify and characterize anomalies on the network. At the first step of the algorithm, the anomaly detection system may output an indication that a foliage blockage exists along a line-of-sight path for a particular node pair. The first step may be accomplished using radio-signal data. At the second step of the algorithm, the anomaly detection system may access LIDAR data to characterize the foliage blockage.

For example, the LIDAR data may reveal the height of the foliage blockage, or the lower perimeter of the blockage. The anomaly detection system may then access data associated with the node pair (e.g., the locations and heights of the each node in the node pair). The anomaly detection system may then determine a treatment based on the characterization of the blockage and the information associated with the node pair. As an example and not by way of

TABLE 1

Foliage Types, Loss, Variation of Loss, and Example Treatments

| Foliage type | Average Loss w.r.t. distance of Tx and Rx | Variation of the loss (or snr, etc.) (also check the correlation to wind strength) | Treatment |
| --- | --- | --- | --- |
| No foliage | N.A | N.A. | No special treatment for foliage |
| Light foliage, time-unvarying | low | low | No special treatment, or use fast link adaptation, e.g., lower the initial MCS configuration; increase the initial TX power configuration; increase step sizes related to link recovery; increase the TX power modification step sizes; increase MCS modification step sizes; make link adaptation faster or skip certain tries |
| Light foliage, time-varying | low | Medium to high | fast link adaptation (as above); fast link recovery, such as switch to other beam pairs in a fast way after the faster adaptation of skip steps in the link adaptation. If historically there are very windy situation, and it causes the loss medium to high during the wind situation even though average over time the loss is low, then such link is preferably to do fast link recovery if it is hit by the medium to high loss for those times when loss variation dominates. |
| Medium foliage, time-unvarying | medium | Low | fast link adaptation, e.g., lower the initial MCS configuration; increase the initial TX power configuration; increase step sizes related to link recovery; increase the TX power modification step sizes; increase MCS modification step sizes; make link adaptation faster or skip certain tries; fast link recovery, such as switch to other beam pairs in a fast way after the faster adaptation of skip steps in the link adaptation |
| Medium foliage, time-varying | medium | Medium to high | Fast beam switching to try to find better beams, or try to find better links to set up the new links. If historically there are very windy situation, and it causes the loss very high during the wind situation even though average over time the loss is medium, then such link is preferably to be replaced. E.g., try to find and set up new links. Or, modify the network planning (e.g., by adding new network node around so new links can be set up to avoid heavy foliage) |
| Heavy foliage, time-unvarying | High | low | fast switch beam pairs, or set up new links, or modify the network planning (e.g., by adding new network node around so new links can be set up to avoid heavy foliage) |
| Heavy foliage, time-unvarying | High | Medium to high | As above for Heavy foliage, time-unvarying. In addition, if historically there are considerable very windy situations, and it causes the loss much higher during the wind situation even though average over time the loss (e.g., without much wind) is not yet hinder the link budget, modifying the network planning could be considered (e.g., by adding new network node around so new links can be set up). | limitation, the anomaly detection system may access radio-signal data for a particular node pair and determine that its line-of-sight path is being blocked by foliage. The anomaly detection system may also access engineering data associated with the node pair and determine that the transmitting node is elevated to a height of 15 feet off the ground and the receiving node is elevated to a height of 11 feet off the ground. The anomaly detection system may then access LIDAR data to characterize the foliage blockage between this node pair. It may determine that a tree is blocking the line-of-sight path between the node pair and that highest point on the tree is 15 feet off the ground. The anomaly detection system may determine that a line-of-sight path may exist if the transmitting node is raised one foot and the receiving node is raised 5 feet. The anomaly detection system may generate a report that includes this characterization and a recommended treatment to raise the transmitting node 1 foot and the receiving node 5 feet. Although this disclosure describes a particular algorithm for detecting and treating an anomaly on a millimeter-wave communications network, this disclosure contemplates any suitable algorithm for detecting and treating an anomaly on a millimeter-wave communications network.

In particular embodiments, radio signal patterns may be recognized by the anomaly detection system through the aid of a machine-learning model. In particular embodiments, radio signal patterns may be recognized by the anomaly detection system through the aid of a machine-learning model. Different radio-signal patterns may be recognized by a machine-learning algorithm and used to identify different types of anomalies. Each anomaly may be associated with a unique radio-signal pattern. These radio signal patterns may be used to differentiate between different types of anomalies. As an example and not by way of limitation, from counter data that are collected from the wireless links between network nodes, the anomaly detection system may derive the time series of path loss of each link. For example, if the received signal to noise ratio (snr), transmit power, transmitter gain (including antenna gain, beam gain etc.), and receiver gain are known from the time series data collected, or derived from the data collected (e.g., antenna beam can be among the data collected, and the gain can be derived via a mapping from the antenna beam to the gain), then, path loss=transmit power+transmitter gain+receiver gain−snr−noise. For another example, if the received signal strength indicator (rssi) is also collected as part of the time series data from the network, then, path loss=transmit power+transmitter gain+receiver gain−rssi. The waveform of the path loss time series for each millimeter wave link may carry information which may reveal whether there is blockage along the link and also the type of blockage along the link. For example, the waveform may indicate that there is blockage and that the blockage is light foliage. Additionally, anomaly detection system may combine radio signal patterns with weather data to determine if the blockage is dependent on the weather.

In one particular embodiments, the foliage detection results obtained by using map data can be used as the detection output results. They can be possibly used to be included in the reports of the monitoring tool. They can be possibly used as the results obtained by one of the learners, to be served as one of the inputs of a function of ensemble, or voter, which can have inputs coming from multiple learners. The foliage detection results obtained by using map data can be also be used as the labels for the ML algorithms using radio signal data and mmWave system engineering data for foliage detection, for supervised learning. In particular one embodiment, one or multiple classes of foliage labels can be generated using the foliage detection results obtained by using map data, as well as using weather data, such as wind, etc. For example, if the foliage is detected as positive for a certain link via using the map data, and this area historically has large wind from time to time, then, the link can be labeled as a link with wind situation. However, if we only use LiDAR data is used, or even together with weather data, sometimes it is difficult to judge the severity of the foliage, especially from the perspective how much loss the foliage is causing to the link. To this end, the radio signal data can be of great usage for more refined classification.

In particular embodiments, one or multiple classes of foliage are detected using data analytics where weather data, radio signal data, engineering data are used together. With weather data, we can know the time when there is wind, and we can also know the strength of the wind. If the related statistics of the radio signal varies much with the strength varying of the wind, then, we could identify it is the foliage which varies with wind. If the related statistics of the radio signal does not vary much with the strength varying of the wind, but we know it is foliage via other means (e.g., by 3D map data), then, we could identify it is the foliage which does not vary much with wind. We can then generate the labels, with enriched classes. These labels can have engineers verification and checking. The labels could also be checked with the results obtained by using map data. Engineers field verification and checking can also be used via engineers eyes. Camera pictures, if any (e.g., some node may incorporate camera), can be also used for verifications for the labels.

Figure 2:
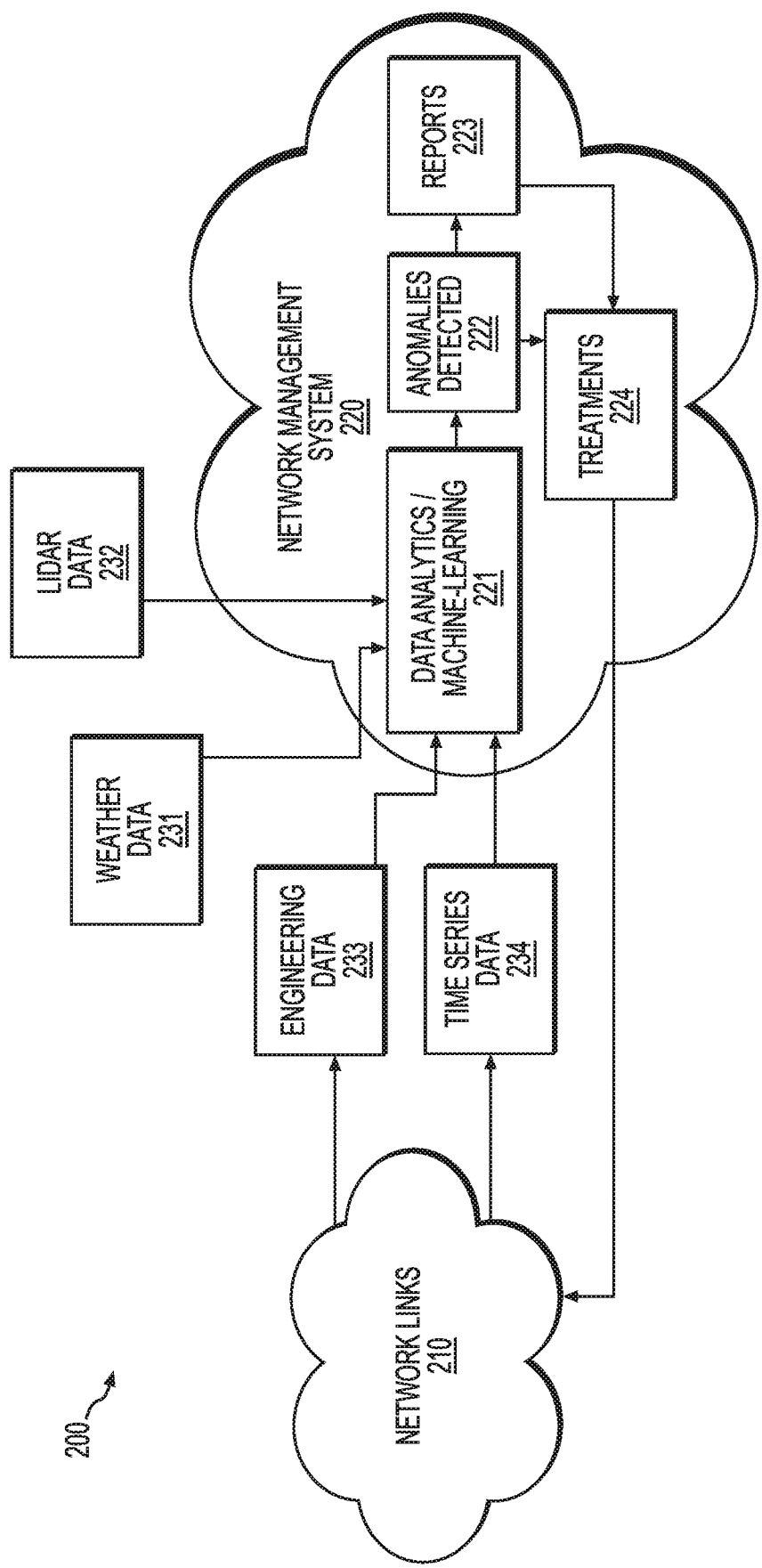
FIG. 2 illustrates example network environment for detecting and categorizing anomalies on the millimeter-wave communication network.

FIG. 2 illustrates example network environment 200 for detecting and categorizing anomalies on the millimeter-wave communication network. Network environment 200 may include network links 210 and anomaly detection system 220. Network links 210 may be the communication links between network nodes in the millimeter-wave communication network. Network links 210 may be associated with at least two types of data: topology data 233 and time series data 234. Engineering data 233 may be data related to the topology of the millimeter-wave communication network, as well as the network configurations or configuration parameters, such as the GPS location, height, orientation, transmission and reception capabilities, and model/serial number of each network node. Time series data 234 may be data related to the functionality of the network nodes. Time series data 234 will be discussed in more detail below with respect to FIGS. 3 through 7. The time series data are historical or realtime data collected from the network. They can be some indicators of the network, counters of the network links, etc. The sampling rate can be dependent on how often the metric is changing. For example, the time series can be signal to noise ratio of each link, and the sampling rate can be one sample per second per link. For another example, the time series can be the transmit beam of each link, and the sampling rate can be, 1 sample per 5 minutes, if the transmit beam does not change very frequently. The anomaly detection system 220 may include a data analytics and machine learning model 221. As inputs to the machine learning model, the anomaly detection system 220 may use engineering data 233, radio signal data 234, weather data 231, LIDAR data 232, or any other suitable form of data. After analyzing the inputted data, the machine learning model 221 may generate a probability that (1) an anomaly has occurred, and (2) a probability that the anomaly is of a particular type. Based on the anomaly type, the anomaly detection system 220 may generate a report 223 that includes an indication that the anomaly exists, a description of the anomaly type, and a description of one or more treatments to mitigate or eliminate the anomaly.

In particular embodiments, the data analytics/machine learning module 221 may use the following data as inputs: weather data and radio signal data. In particular embodiments, map data and human-generated data may also be used as inputs. This data may be used to general labels with classes for supervised learning. In particular embodiments, each class of foliage may be associated with certain conditions of KPIs, KQIs, as discussed herein. The machine-learning model 221 may be trained using the radio-signal data with labels that indicate which type of anomaly is associated with the particular waveform of the radio-signal data. For example, the waveform of heavy foliage blockage may behave a certain way across substantially all links that have heavy foliage blockage. The machine-learning model may be trained on many waveforms that are labeled "heavy foliage." Once trained, the machine-learning model may rapidly analyze radio-signal data waveforms and classify each waveform accordingly. For example, the machine-learning model may classify one waveform as "heavy foliage," another waveform as "light foliage," another waveform as "interference," another waveform as "software malfunction," another waveform as "hardware malfunction," and another waveform or waveforms as any other suitable anomaly classification.

In particular embodiments, supervised learning can be used in the machine-learning module 221. In the supervised learning, the dependent variable y may be the class of foliage. The label may be the ground truth, from field observation, camera data, detection results from LIDAR data, or any other suitable reliable source of information. The label may depend on how many classes are needed. For example, the label may be 1 or 0, where 1 means that foliage blocks the line-of-sight path and 0 means that the line-of-sight path is clear. A third label may be 2, which may indicate heavy foliage, and a 1 may indicate light foliage. In particular embodiments, for the independent variable x, the independent variable may include multiple vectors. Each vector may be a time series of one feature, or a time series of one of the statistics (e.g., KPI, KQI). As an example and not by way of limitation, F features may be used ($x_1, x_2, \ldots x_F$). In this example one feature $x_1$ may be the standard deviation of the signal to noise ratio (snr), where each standard deviation is calculated over a time window (e.g., 3 minutes). If there is a series of time windows, the time series of the standard deviation of snr is formed. Another feature may be the average of the modulation and coding scheme (MCS) indicator, each average being calculated over a time window T. If the time windows are disjoint, then for a total time duration of Z, the number of points in the time series is Z/T. If the time windows are formed by sliding the window, and sliding step-size (e.g., the time interval of the two starting points of the two consecutive windows) is S, then the number of points in the time series is Z/S. These points may be for a single link between a transmitting node and a receiving node. For F features in a link, there may be F time series for the data of that link (e.g., one time series for the path loss if path loss is a feature, one time series for the snr if snr is a feature, and so on). In a millimeter-wave communication network, there may be N links, where each link comprises a transmitting node and a receiving node.

In particular embodiments, under supervised learning, the data with ground truth labels may be split into "training" data and "testing" data. The training data set may be used to build the model, where the model may be understood as $y=f(x_1, x_2, \ldots x_F)$. Here, y is the label (e.g., 0, 1, 2 . . . ), and $x_1, x_2, \ldots x_F$ are the input features. The testing data may be used to determine how good the trained model is. Assume the trained model is obtained by using the training data. The model may be $y=f(x_1, x_2, \ldots x_F)$. Then, testing data is fed into the model, and y* may be calculated as $y*=f(x_1, x_2, \ldots x_F)$. Then, y* may be compared with the ground truth label in the testing data, and the error may be calculated.

In particular embodiments, the data analytics/machine-learning module 221 may be any suitable model, including a deep learning model if the data is suitable for deep learning, using a deep neural network or a convolutional neural network. If either of these models is implemented, some of the manual feature extraction may be omitted. In particular embodiments $x_1, x_2, \ldots x_F$ and y may be used in the training data. The training data may be used to obtain a model f. Then $x_1, x_2, \ldots x_F$ may be used in the testing data, and using the trained model f, y* may be calculated. Then y and y* may be compared to calculate the error. In particular embodiments, the steps to select and train a machine learning model may be summarized as label generation, feature extraction, feature selection, model selection, training, and testing. In particular embodiments, the labels for the machine-learning algorithm may be modified iteratively. Initially, the labels for the machine-learning model may be generated using one or multiple of the following: the engineers field observations, google earth map check, the 3D map based solutions, or engineering rule-based solutions (e.g., general human-made rules that roughly identify anomalies based on waveform types). Afterwards, the labels may be checked and modified in one or multiple iterations. As an example and not by way of limitation, after using the initial set of labels to train the model, some false alarms in the training error may be found (e.g., the machine-learning model outputs foliage when the label says no foliage). After double checking, the foliage may indeed be there, and the label was incorrect. As a result, the label in the training data may be modified.

The anomaly detection system 220 can be performed on remotely-located backend servers, or on a server computing machine at the location of the millimeter-wave communication network. Although FIG. 2 illustrates a centralized machine-learning approach, the anomaly detection system can use a distributed approach, where the derived decision-making package including the trained model and rules can be applied in a distributed way. In particular embodiments, the derivation of the labels and rules for the machine-learning model may be centralized. In particular embodiments, the model may be updated depending on the data that is received. Regardless of whether the anomaly detection system 220 is centralized or decentralized, the data and machine learning algorithm may be used to detect which link or links have an anomaly (e.g., problem) and to determine a category for the anomaly. Examples of anomaly categories include foliage blockage, non-foliage blockage, time-varying blockage, constant blockage, interference, poor weather conditions and the degree of weather severity (e.g., mild, medium, heavy), and problems with the network nodes (e.g., software or hardware issues). Although this disclosure describes a particular anomaly detection system capable of detecting anomalies in a particular manner, this disclosure contemplates any suitable anomaly detection system capable of detecting anomalies in any suitable manner.

In particular embodiments, the output of the data analytics/machine learning model 221, i.e., the anomalies detected 222, may be used to generate a report 223. The report 223 may be used for millimeter-wave network monitoring. The report 223 may also be used for network diagnostic purposes to identify problems on the network. The anomalies detected 222 and the reports 223 may be used to optimize the millimeter-wave communication network via recommended treatments 224. The recommended treatment for the anomaly may be an automated treatment or may be a manual treatment. As an example and not by way of limitation, if the anomaly is categorized as being heavy foliage, the recommendation may include trimming a tree that is blocking the line-of-sight path between two network nodes. Another example of a treatment may be a micro re-planning, which may be an installation of an additional network node. As an example and not by way of limitation, if a tree is blocking a line-of-sight path between network node A and network node B, an additional network node C may be installed in a location that has a line-of-sight path to both network node A and network node B. Communications may then "hop" from network node A to network C, and finally to network node B. In particular embodiments, alternative network nodes may already be installed and running on the millimeter-wave communication network. In such a situation, a treatment may be to re-route signals to avoid blockages. As an example and not by way of limitation, if a communication link is currently established between network node A and network node B, but the line-of-sight path unexpectedly becomes blocked by a tree or other object, the network management system may access the network topology and identify another network node C that has a line-of-sight path to both network node A and network node B. Communications may then "hop" from network node A to network C, and finally to network node B. Other example of treatments may include link switching, interference avoidance or mitigation. Although this disclosure describes recommending particular treatments in a particular manner, this disclosure contemplates recommending any suitable treatments in any suitable manner. Moreover, although foliage related anomalies are used as examples, the anomaly detection system may be applied to other anomalies than just foliage related anomalies.

In particular embodiments, Data Analytics/Machine Learning module 221 may include a "whitebox" solution. Instead of using machine learning exclusively, the whitebox solution may rely on engineering rules to determine the anomaly type. In such a scenario, using engineering data and 3D map data, the blockage (e.g., foliage blockage, non-foliage blockage) can be detected without machine learning. More than one data sources are input to the anomaly detection module, including e.g., counter data, engineering data, weather data, 3D map data. In the anomaly detection module 221, engineering rules-based anomaly detection can be regarded as a whitebox solution. Machine learning based anomaly detection can be regarded as a blackbox solution. For a machine learning based solution, the labels can be from one or multiple sources, including, e.g., labels from engineering rules, labels from detection results using engineering data and the 3D map data, labels from camera data, labels from engineers' field visits and inspections. In particular embodiments, an ensemble may be used to enhance the detection qualities, where the ensemble may take inputs from e.g., the detection using 3D map data, the engineering rule based detection, the machine learning based detection. The ensemble may also take multiple learners from the machine learning based detection. The anomaly detection module 221 may output anomaly detection results. In particular embodiments, a report 223 may be generated. The results and reports may be used to recommend treatments which may possibly optimize the network. The treatments may be manual or automated. As an example and not by way of limitation, there may be automated optimization triggered by the anomaly detected at anomalies detected box 222, while the reports 223 may be used for human intervention of manual solutions for optimization. In particular embodiments, data analytics/machine-learning module 221 may include both a whitebox and a blackbox solution. Engineering data, 3D Lidar data, engineer field observations, and camera data may be used to detect blockages and create labels for the machine-learning based blackbox approach. Simultaneously, the blockage detection may be fed straight into the "whitebox" and rules may be applied without the use of machine learning. As an example and not by way of limitation, if the 3D LIDAR data reveals that a foliage blockage exists, and characterizes the blockage in some way (e.g., light foliage of height 5 meters), the whitebox solution may have a particular rule to apply to this scenario (e.g., raise the transmitting and receiving nodes 1.5 meters).

In particular embodiments, ensemble methods can be used. Ensemble methods can use multiple learning algorithms to obtain better predictive performance than could be obtained from any of the constituent learning algorithms alone. For example, a voting can apply. If two learners (one learner being one learning method or algorithm) give a prediction as 'foliage', while a third learner gives 'not foliage', then by a majority voting, the result can be 'foliage'. The ensemble can also have other ways than voting. The ensemble can have the input from whitebox, one or multiple different blackboxes, where one blackbox can be corresponding to a certain feature selection and model selection. In other words, if the selected feature is fixed, while models are being changed, different trained models for the blackbox may be used. Furthermore, if the model is fixed while the selection of the features is changed, different trained models for the blackbox may be obtained. Each obtained trained model can be treated as a learner. The ensemble can have one or multiple learners of the blackbox. The ensemble can also have the input from the engineers field observations if needed, the camera results if needed, the 3D map analysis if needed, and so on.

The machine learning based anomaly detection exemplary processes may be described as follows. The labels are generated. The features are extracted. The features can be selected accordingly. The models can be selected. And training and testing can be carried out. Then, the results can be evaluated. The model may be evaluated and summarized, as well as the conditions of the proposed features as the outcome of the obtained model. Here, some iterations may be performed, if the model quality is not very satisfying, different features may be chosen, data may be enhanced (e.g., add more data samples), the sliding window size may be changed, and other suitable adjustments may be made. Then the different results may be compared and the best model may be selected. This process may be performed to any number of classes as long as there is enough labeled data not to overfit the model.

In particular embodiments, the labels for the machine-learning algorithms may also be modified iteratively. Initially, the labels for machine-learningblackbox solution can be generated via using one or multiple of the following, the engineers field observations, google earth map check, the 3D map based solutions, the engineering rule based (whitebox) solutions. Afterwards, the labels could be double checked and modified, after seen the training results of the machine-learning algorithm using the initial labels. And this could be done in one or multiple iterations. For example, after using the initial set of labels to do training, some false alarms in the training error may be found (e.g., it should be the foliage and using the machine-learningblackbox prediction based on the training data, it gives foliage, while the label says no foliage). After double checking, the foliage is indeed there, and it was a missing label using the initial methods for the labeling, hence, the label in the training data may be modified. Similar label iterations can be carried out for the labels for the testing data. If all the data is used as training data, then the label iteration for the labels in the training data as may be executed. When there are different models and different features are selected, the training model may be different, and the iteration of labels can continue to be carried out by checking different models obtained from the training.

In particular embodiments, an extension of the machine learning algorithm may be for the design of link adaptation or for the optimization for link adaptation. For this, the bad KQIs may be labeled (e.g., low throughput, or high PER), and at the same time, a possible remedy will be a special treatment of this kind of channel. As an example and not by way of limitation the anomaly detection system may recommend using special adaptation (e.g., starting MCS being lower than in general), or very fast link recovery (e.g., large step size), or even skip certain adaptation and jump to the process of using alternative links. If these treatments are labeled, then the machine learning algorithm may be used to learn the model where the characteristics of the channel related measurements as the input of the model, where the output can be the way of link adaption, or the treatment. Then, this solution can be specifically good for the new design, or optimization of the adaptation. In particular embodiments, the machine learning model may be updated, when we have more new data. In particular embodiments, labels can be coming from clustering, or combination of clustering and engineers rules. Semi-supervised learning can apply. The clustering can be, e.g., using the features (e.g., similar features as those used in the machine learning module), and clustering can be done. The clustering can output labels. The clustering method can be, e.g., K-means, etc. Unsupervised learning can also apply to learn the anomaly.

Figure 3:
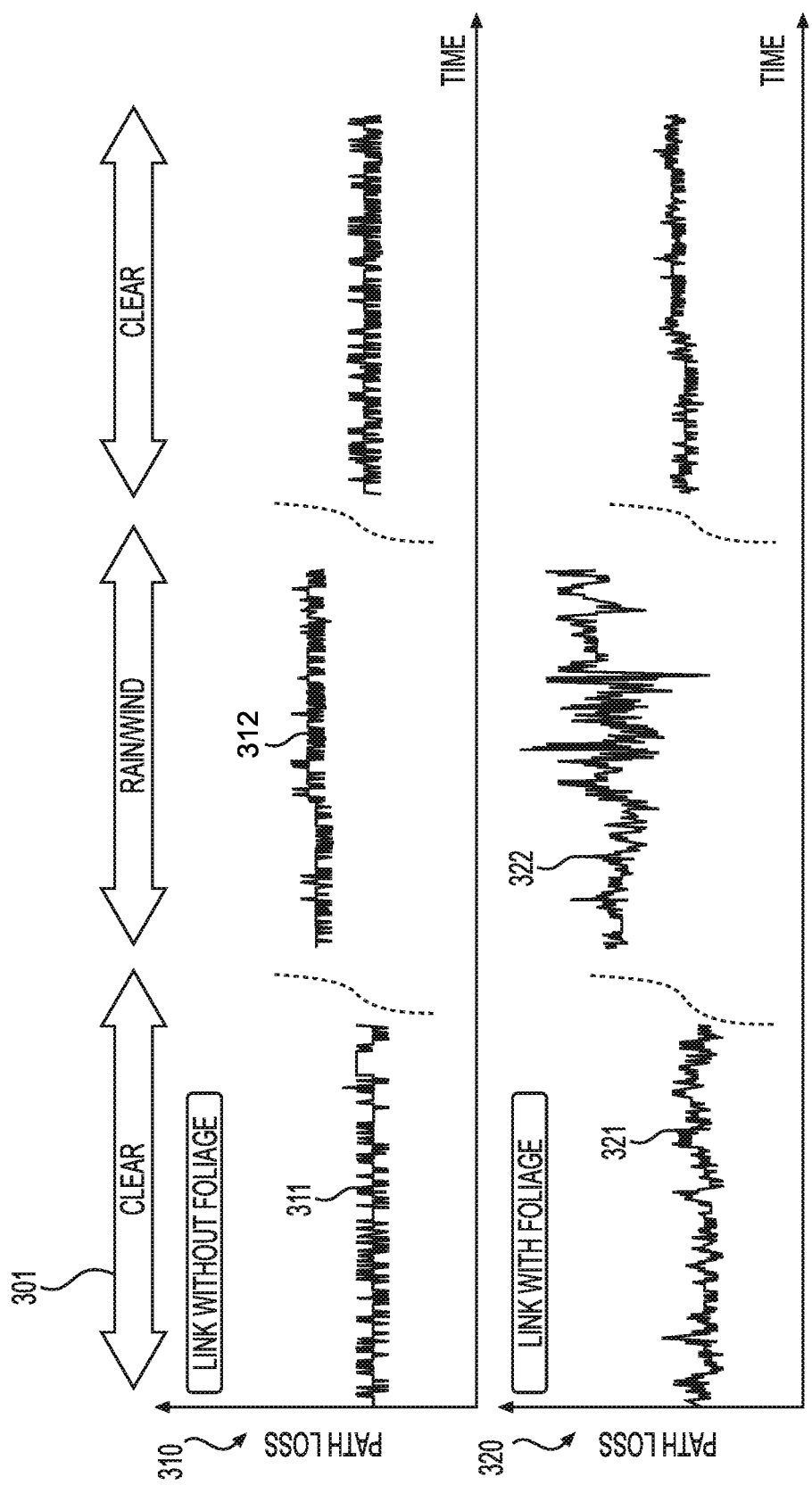
FIG. 3 illustrates an example time series path loss of example radio signals between transmitting nodes and receiving nodes.
Figure 4:
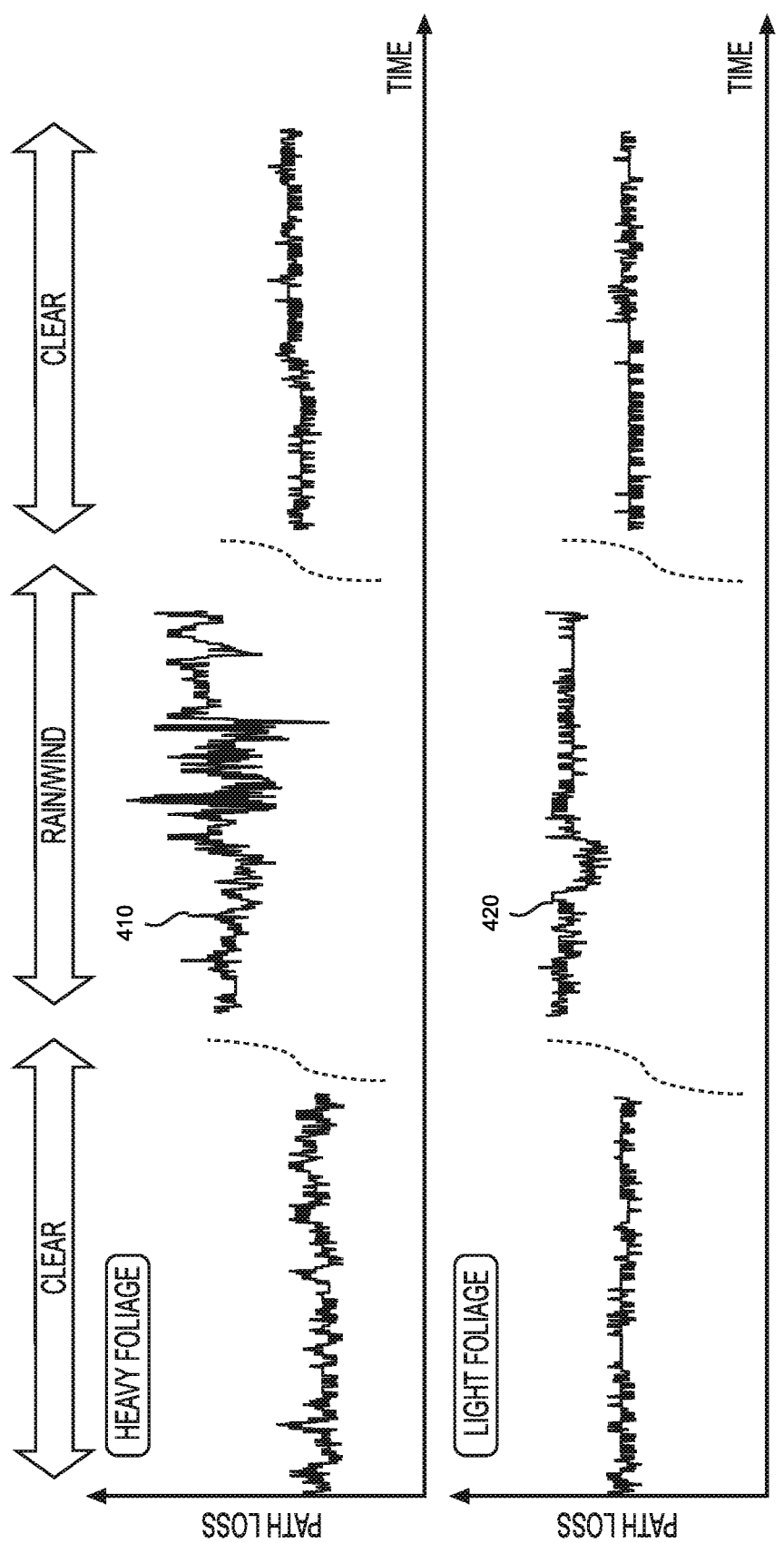
FIG. 4 illustrates an example time series path loss of example radio signals between transmitting nodes and receiving nodes.

FIG. 3 illustrates example a set of time series path loss waveforms of example radio signals between transmitting nodes and receiving nodes. Waveform 310 may be generated when the line-of-sight path between the transmitting node and the receiving node is clear. Waveform 320 may be generated when the line-of-sight path between the transmitting node and the receiving node is partially blocked by foliage. Weather labels 301 may indicate the weather. A weather label 301 of "clear" means that there is no rain or wind. There may be three segments of time for each link associated with waveforms 310 and 320 that are discontinuous. During a segment, time may be continuous. A weather label 301 of "Rain/wind" means that the weather was windy and/or rainy (e.g., wind above a threshold speed, rainfall above a threshold rainfall during a given time window) during the time indicated by the x-axis. When there is rain/wind, the waveform of path loss of waveform 320 is much more varying than waveform 310. This variance may indicate that a tree branch with leaves is blowing into the line-of-sight path corresponding to the waveform 320 during the rain/wind period. As can be seen by waveform 312, when there is rain/wind, the path loss signal increases, but increases uniformly. On the other hand, when there is rain/wind, the path loss waveform 322 becomes more sporadic. This may be an indication that foliage is rustling or swaying in the wind and crossing the line-of-sight path between the relevant node pair. Another indication that the link has a foliage blockage may be that during clear weather, the path loss waveform 321 is still somewhat erratic. FIG. 4 illustrates another set of time series path loss waveforms of example radio signals between transmitting nodes and receiving nodes. These waveforms may be used to understand the difference between a link with heavy foliage blockage and a link with light foliage blockage. The top example waveform corresponds to a link with heavy foliage blockage and the bottom example waveform corresponds to a link with light foliage blockage. The anomaly detection system may be able to determine that the top waveform corresponds to heavy foliage and that the bottom waveform corresponds to light foliage based on the waveforms alone via the machine learning model. During rain/wind, waveform 410 may be more erratic than waveform 420 because the link associated with waveform 410 has heavier foliage than the link associated with waveform 420.

Figure 5:
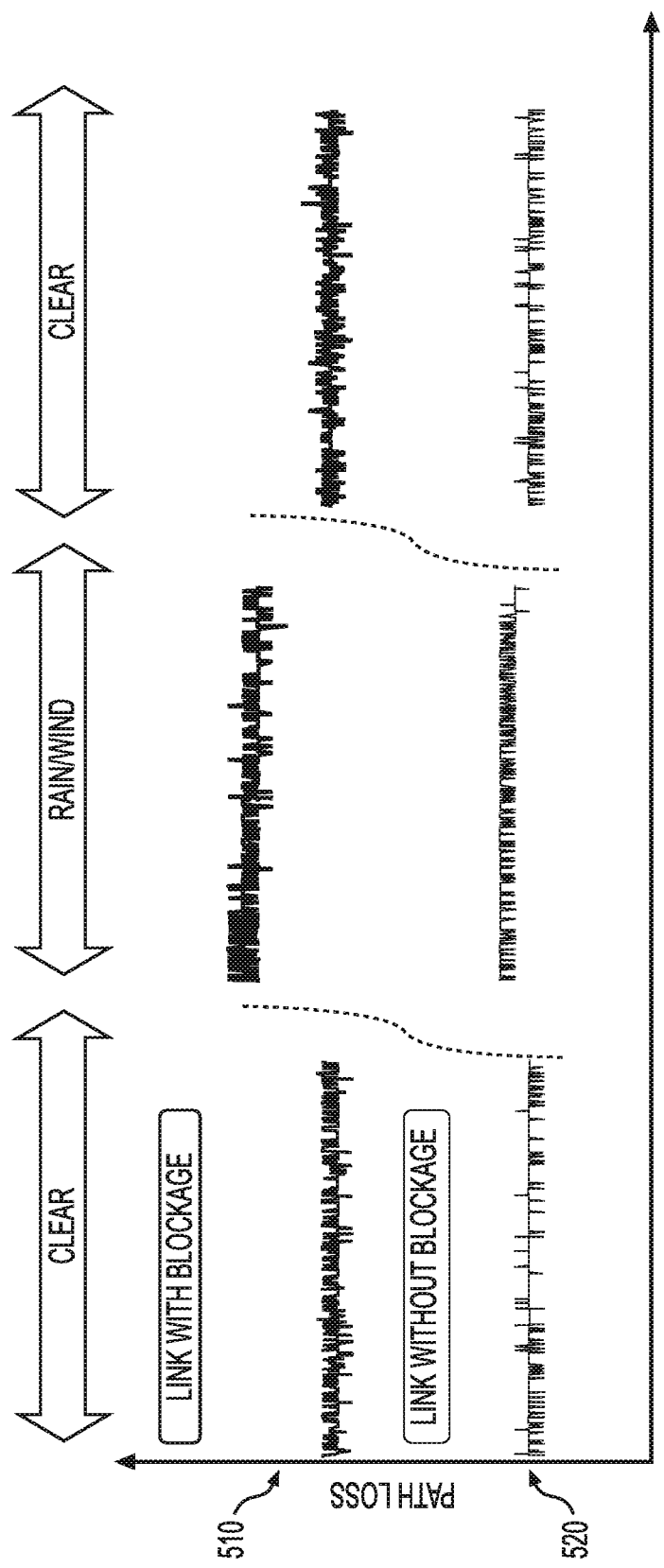
FIG. 5 illustrates an example time series path loss of example radio signals between transmitting nodes and receiving nodes.

FIG. 5 illustrates an example time series path loss of example radio signals between transmitting nodes and receiving nodes. These waveforms may be used to understand how the anomaly detection system may group links together based on the physical distance between the transmitting and receiving nodes for each node pair. Waveform 510 may be associated with a link that is the same distance as the link associated with waveform 520. But since the path loss for waveform 510 is greater than the path loss for waveform 520, it is likely that the link associated with waveform 510 is being blocked by some object. If the link associated with waveform 510 was not blocked, the average value of waveform 510 would be substantially similar to the average value of waveform 520, since both links are approximately the same distance. The same method may be applied to many links in the network. The anomaly detection system may group links of similar distances. As an example and not by way of limitation, the anomaly detection system may create a first group for links between 20 and 25 meters long (i.e., the distance between the transmitting node and the receiving node is 20-25 meters), a second group for links between 30 and 35 meters long, and a third group for links between 40 and 45 meters long. The grouping of the links can be also done by using clustering method, such as K-means, etc. The anomaly detection system may then calculate the average path loss for all the links in each group. If any link has a path loss that is substantially above the average (e.g., links in the 90th percentile of the path loss, etc.), the anomaly detection system may determine that an object is blocking the line-of-sight path between the nodes for that node pair. Another method is to look into certain feature, for example, a feature which is pathloss_exponent=log(path loss)/log(distance of tx and rx). The anomaly can be those which has very high pathloss_exponent (e.g., links in the 90-percentile of the pathloss_exponent). The above methods can be used for time-invarying blockage, as well as time-varying blockage (e.g., a moving truck, or other moving object blocking the line of sight. For the time-varying or dynamic blockage, the degradation of the pathloss along the time line can be detected, or the pathloss_exponent increasing along the time line can be detected. If the degradation or the increase is beyond a certain threshold, or relative value (e.g., percentage) of the degradation or the increase is beyond a certain threshold, and also it lasts for certain amount of time, then the time-varying anomaly can be detected. Although this disclosure describes identifying a block between a line-of-sight path between network nodes in a particular manner, this disclosure contemplates identifying a block between a line-of-sight path between network nodes in any suitable manner.

Figure 6:
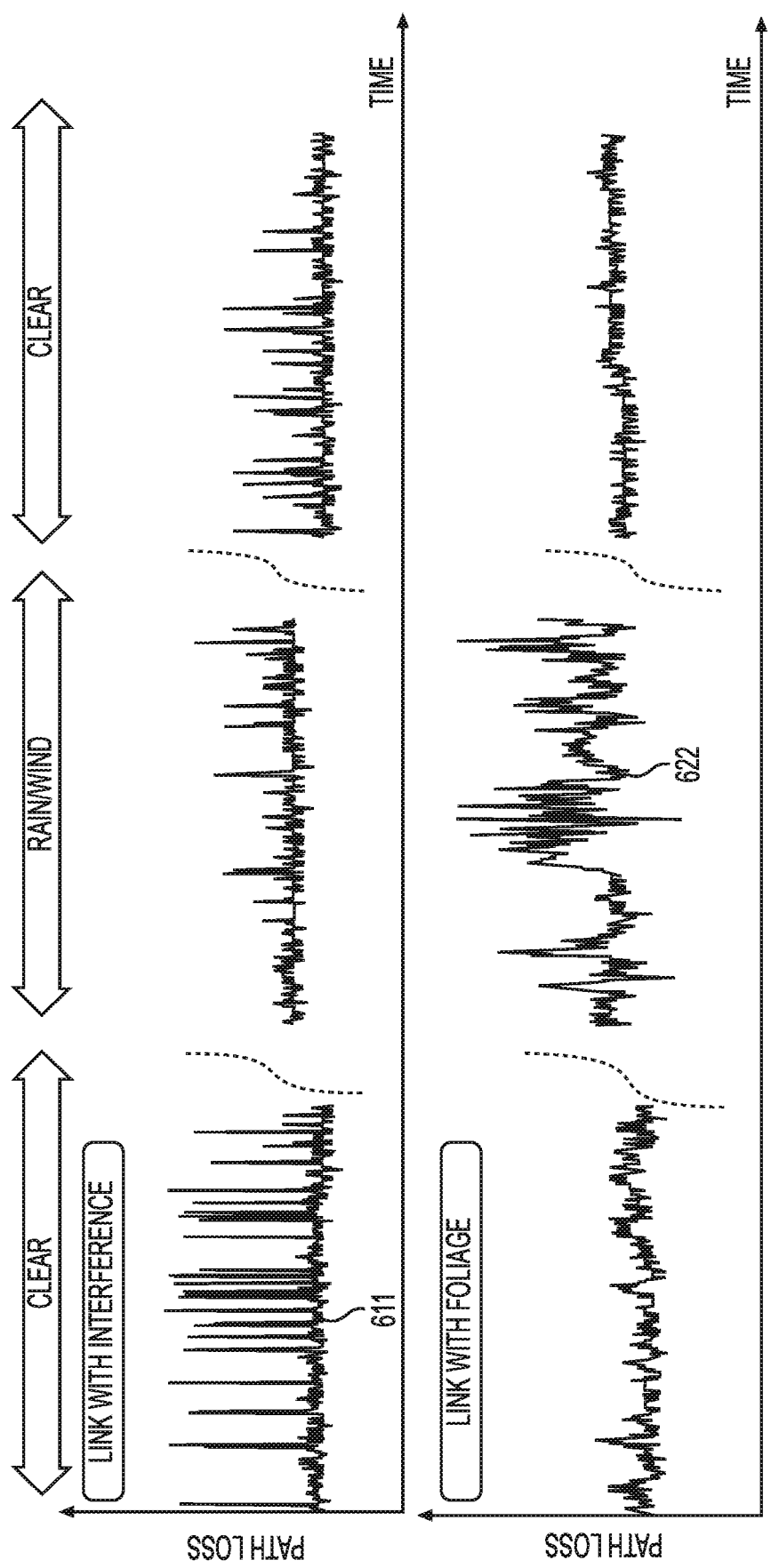
FIG. 6 illustrates an example time series path loss of example radio signals between transmitting nodes and receiving nodes.

FIG. 6 illustrates an example time series path loss of example radio signals between transmitting nodes and receiving nodes. These waveforms may be used to understand how the anomaly detection system identifies links with interference issues. Even when the weather is clear, a link that suffers from interference with another link may have an erratic path loss waveform, as shown by waveform 611. Note that waveform 622, as well as the other waveforms on the bottom of FIG. 6 behave consistent with a waveform associated with a link that has a foliage blockage. Therefore, the anomaly detection system may be able to differentiate between a link with interference issues and a link with a foliage blockage based solely on the waveforms of the path loss signals for those links. Although this disclosure discuss path loss signals, this disclosure contemplates determining an anomaly type using any suitable type of waveform, such as signal-to-noise ratio, because each type of waveform will have unique characteristics for each type of anomaly.

Figure 7:
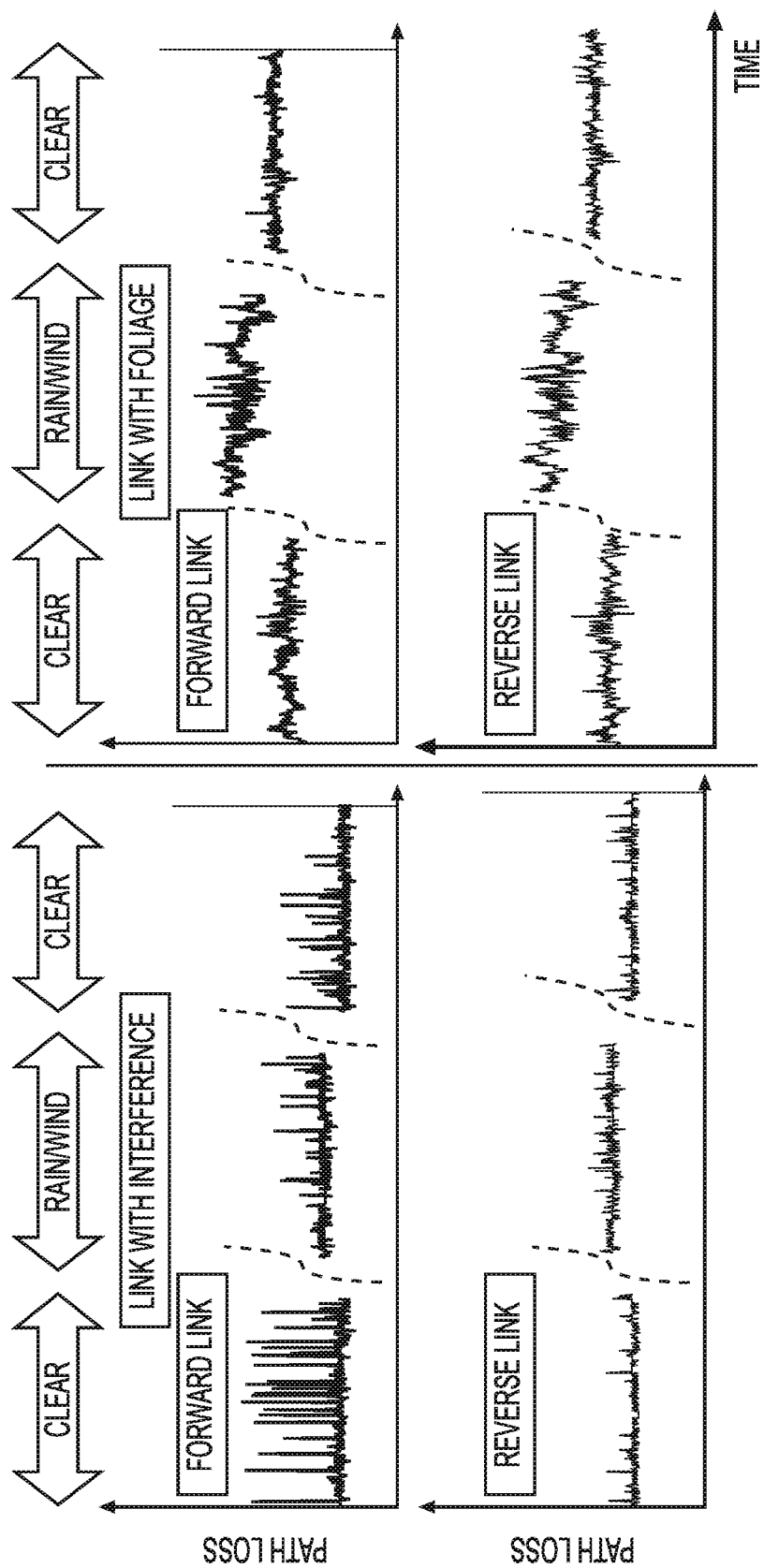
FIG. 7 illustrates an example time series path loss of example radio signals between transmitting nodes and receiving nodes.

FIG. 7 illustrates example time series path loss waveforms of example radio signals between transmitting nodes and receiving nodes. The waveforms on the left are links with interference and the waveforms on the right are links with foliage blockage. The waveforms on the top are forward links and the waveforms on the bottom are reverse links. The anomaly detection system may be able to differentiate between foliage and interference based on the asymmetry between the forward link and the reverse link for each type of anomaly. For example, the reverse link waveform for the interference link is not symmetrical to the forward link waveform for the interference link. But the forward and reverse links for the foliage blockage waveform link are the same. These differences in the forward link and reverse link waveforms for interference can be used as features in machine learning. Note that a dynamic radio signal is used to determine whether the link has interference or not. The radio signal carries hidden information regarding whether the link has interference or not. The anomaly detection system may not need to rely on interference measurements, which may require excessive resources to measure and which in turn may hurt the system's efficiency. Instead the machine learning-based approach can determine whether a link suffers interference via the waveform of the dynamic signal such as path loss, signal to interference and noise ratio, etc.

In particular embodiments, one or more features used in data analytics/machine learning can be derived from the time series data. The features can represent a statistic metric of time series of a e.g., path-loss, a signal-to-noise ratio, or a signal-to-interference-noise ratio of the link between the first node and the second node, where the statistic metric can be a mean, a standard deviation, etc.

In particular embodiments, one or more features used in data analytics/machine learning can be derived from the time series data. The features can represent a difference of a statistic metric of time series of e.g., a path-loss, a signal-to-noise ratio, or a signal-to-interference-noise ratio of a forward link between the first node and the second node, and the respective statistic metric of time series of a reverse link between the second node and the first node, where the statistic metric can be a mean, a standard deviation, etc.

In particular embodiments, if the path loss varies fast with rain/wind (e.g., the standard deviation of path loss is greater than a certain threshold m), or the path loss varies faster during the rain/wind than when there is no wind (e.g., the standard deviation of path loss during rain/wind is greater than the one where there is no wind by a certain threshold n), it may be determined to be foliage. In particular embodiments, if the average path loss is larger than the average (or median) path loss of similar-distanced node pairs by a certain threshold x only occasionally, then it can be an occasional blockage. On the other hand, if the average path loss is larger than the average (or median) path loss of similar-distanced node pairs by a certain threshold x continuously or in a large portion of the time, then it may be determined to be a constant blockage. In particular embodiments, if the average path loss is greater than a first threshold, and the standard deviation of path loss is greater than a second threshold for one side of the link (e.g., forward link), while on the other side of the link (e.g., reverse link), the standard deviation of the path loss is smaller than a third threshold, then it may be a link pair with one-side interference. If a link's path loss varies fast even when the weather is clear (no rain/wind), e.g., the standard deviation of the path loss is greater than a certain threshold, the link can be suffering interference. In particular embodiments, if a pair of links has symmetric forward/reverse links where both sides have large varying path loss due to rain/wind, then the link may be a foliage link. If a pair of links presents asymmetric forward/reverse links where one side has large varying path loss while the other link is different enough (e.g., the difference of standard deviation of the path loss of the forward/reverse links is beyond certain threshold), then the link can be a link pair can be with one-side interference for one of the links of this pair.

Note that this disclosure primarily uses statistics of path loss as the exemplary radio signal for the conditions. However, this disclosure contemplates the user of other radio signals such as snr, rssi, mcs level, or any other suitable signal. This disclosure also contemplates the use of combining two different types of radio signals, such as snr and path loss jointly, to determine and classify anomalies. This disclosure also contemplates using other statistics than mean, standard deviation, such as median, p-percentile, where p can be, e.g., 5, 10, 15, 25, 50, 75, 85, 90, 95, etc. In particular embodiments, if the radio signal patterns present an abnormality that does not follow the above wireless communications principles, then the anomaly detection system may classify the anomaly as a software problem on the network node or a hardware problem associated with a network node. Examples of these types of issues include, e.g., link is good so transmitting power could be reduced, but the transmitting power always shows maximum on the waveform; when snr is bad, the transmitting power shows low, and it does not boost up at all to compensate the link budget.

In particular embodiments, the dynamic radio signal (e.g., time series data) may be used to determine whether the link has interference or not. The radio signal may carry hidden information regarding whether the link has interference or not. The anomaly detection system may not need to rely on interference measurement which may need to take resources to do that and which may hurt the system's efficiency. Rather, the machine-learning based approach can tell whether a link suffers interference via the waveform of the dynamic signal such as path loss, signal to interference and noise ratio, etc. One of the advantages is to increase the system efficiency by reducing the interference measurement necessity. In particular embodiments, the machine learning module may be applied to recognize the radio signal patterns, where each type of anomaly may have its own recognizable radio signal pattern. A machine-learning algorithm may then be used to determine these thresholds in the engineering rules. In particular embodiments, one or more machine-learning algorithms may also generate their own rules, instead of using the engineering rules with threshold determined by the machine-learning algorithm. The features may be coming from the engineers. The machine-learning algorithm may find new rules that engineers may not have summarized, e.g., a new set of conditions, obtained from the ML models (such as a decision tree model, etc.). The machine learning algorithm may also be used to possibly find new models to predict those patterns (e.g., a model which summarize how to determine the patterns). The features used may or may not come from engineers. For example, if deep learning is used, the features may not be derived by engineers. The new models sometimes may not be explicitly written as a set of combined conditions of features, rather, it is an implicit predictive model.

In particular embodiments, in machine learning, sets of proper samples may be selected out of the all the available samples in building the predictive models, to improve model quality. As an example and not by way of limitation, more balanced number of samples are used in training. If there are many more samples for non-foliage v.s. foliage, down-sampling for non-foliage samples may be used. As another example and not by way of limitation, the data samples selection may be associated with weather data, and select the data samples to the needed amount, for respective weather conditions. For instance, if there are many more samples for good weather (no wind/rain) in a certain deployed area than there are samples collected when the weather is bad (e.g., wind/rain), the samples with good weather can be down-sampled.

In particular embodiments, the weather data may be utilized in a way that the conditions (e.g., the thresholds used in anomaly detection) are adapted based on the weather. For example, when it rains, the pathloss, sinr, snr, rssi, mcs, etc., could be possibly all getting worse. In such a situation, the thresholds related to the conditions for the anomaly may be relaxed, compared to the thresholds used when the weather is sunny. For example, if a blockage is along the way of a link, if it is sunny, a threshold for the blockage could be set as pathloss_exponent>Thr, while if it is rainy, the condition can become pathloss_exponent>Thr+offset, where the offset can be, e.g., a value of 3 db; or the offset itself can be depending on the level of the rain, e.g., offset=3 db if heavy rain, offset=1 db if light rain, etc. For a foliage link, the offset could also be similarly depending on the wind strength. In particular embodiments, the weather condition may also be used to generate an anomaly label called "deterioration due to weather" if no other anomaly such as blockage is detected but the path loss worsens by a certain amount compared to the path loss in good weather conditions.

In particular embodiments, once an anomaly is identified and classified, the anomaly detection system may determine a treatment for the anomaly. Table 2 below provides additional anomaly types to those listed in Table 1. In the table, it also lists the anomaly type, typical characteristics that are discovered by engineer, which are used as the basis as the engineering rules for anomaly detection. As all these may not be foliage related, the correlation with weather (such as wind, rain, etc.) can be also different from those foliage links. E.g., the foliage link could be very stable when there is no wind, while the interference, if exists, could be dynamic even if the wind does not exist. In the table, pathloss_exponent means pathloss (in db or dbm)/log(distance of tx and rx).

TABLE 2

Additional Anomalies, Characteristics, and Treatments

| Anomaly type | Typical characteristics | Treatments/Actions |
|---|---|---|
| Occasionally blockage (in time domain), e.g., flying bird, moving bus, etc. | Pathloss, snr, rssi, etc., get worse in certain time window; mostly two sides (two directions of the links); and interference scanning not showing strong interference. | Fast link adaptation, fast link recovery |
| Constant blockage | Pathloss, snr, rssi, MCS, etc. are bad comparing to links with similar tx-rx distances; pathloss_exponent is bad; mostly two sides (two directions of the links) | Fast link recovery; if severe, topology modification. |
| Interference | Pathloss, snr, rssi, etc., get worse in certain time window; mostly one-side (one direction of the links); if two sides, together with interference scanning showing strong interference. | Interference mitigation; interference nulling solutions; etc. |
| Hardware issue | Against wireless principles (e.g., relationship of TX power and SNR does not follow wireless communications principles (laws), etc. For instance, link is good so suppose tx power could be reduced but tx power always shows max; when snr is bad, the tx power does not boost up at all to compensate the link budget). Rebooting might help | Rebooting; replacement of hardware |

Table 3 below lists more example treatments for detected anomalies. In the table, the word 'faster' means more aggressive adaptation, e.g., using larger step size if any, skipping some more iterations, skipping some more steps, etc., comparing to the word 'fast'.

TABLE 3

Example Treatments for Detected Anomalies

| Problem (pattern recognized) | Treatments (optimization) |
|---|---|
| Occasional Light Blockage (due to foliage) | No treatment; fast link adaptation; fast link recovery, (weather related) |
| Constant Light Blockage (due to foliage) | Fast link adaptation; fast link recovery (weather related) |
| Occasional Light Blockage (due to non-foliage) | No treatment; fast link adaptation; fast link recovery |
| Constant Light Blockage (due to non-foliage) | Fast link adaptation; fast link recovery |
| Occasional Heavy Blockage (due to foliage) | Fast(er) link adaptation; fast(er) link recovery, (weather related); trimming |
| Constant Heavy Blockage (due to foliage) | Fast(er) link adaptation; fast(er) link recovery, (weather related); trimming; topology modification |
| Occasional Heavy Blockage (due to non-foliage) | Fast(er) link adaptation; fast(er) link recovery |
| Constant Heavy Blockage (due to non-foliage) | Fast(er) link adaptation; fast(er) link recovery, topology modification |
| Interference-one side | Interference mitigation, one-side; fast link adaptation; fast link recovery |
| Interference-two side | Interference mitigation, two-side; fast link adaptation; fast link recovery, topology modification |
| Software/Hardware problem | Rebooting; replacement |

Figure 8:
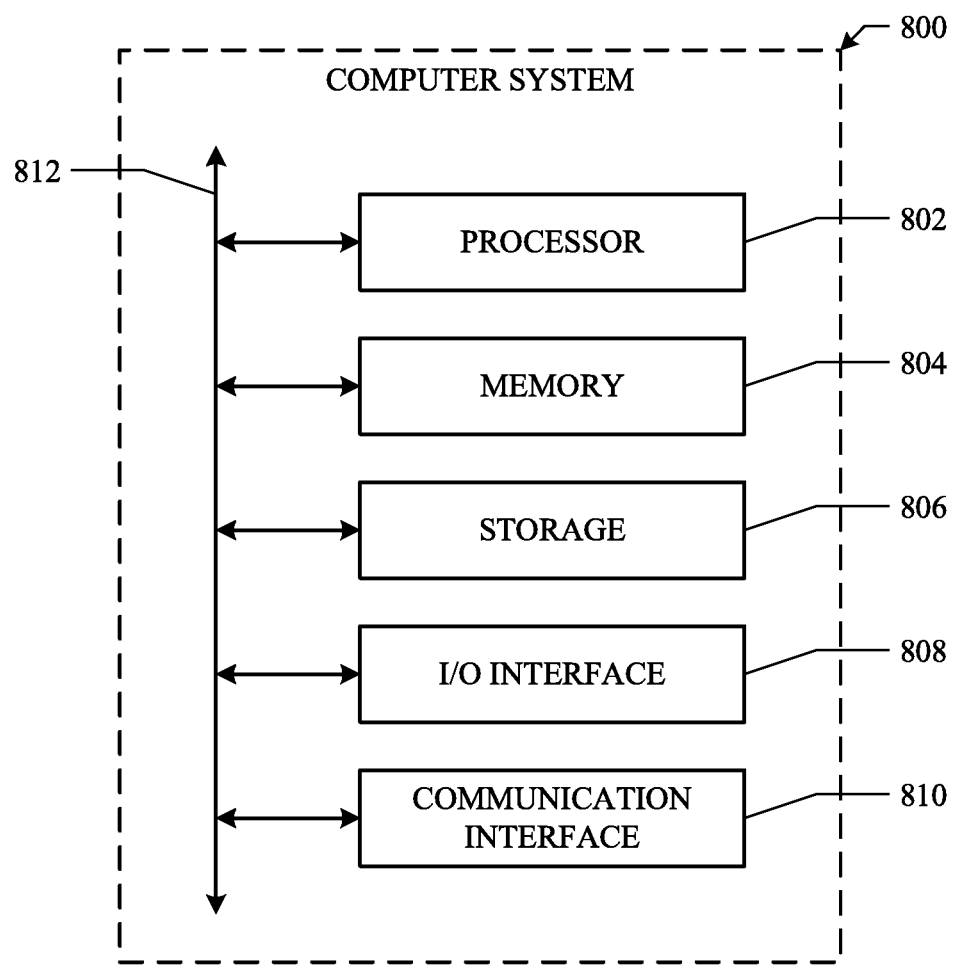
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    accessing time series data of a wireless communication link between a first node and a second node on a millimeter-wave communications network;
    determining that an anomaly exists in the time series data;
    deriving one or more features from the time series data, wherein the one or more features includes a first feature that comprises a measure of asymmetry between a first waveform representing a first path loss on a forward link between the first node and the second node and a second waveform representing a second path loss on a reverse link between the second node and the first node;
    determining, without measuring interference along the wireless communication link, an anomaly type for the anomaly by inputting the one or more features derived from the time series data into a machine learning module, wherein the machine learning module, identifies, for a given anomaly, a corresponding anomaly type from a plurality of anomaly types based on one or more radio signal waveform patterns corresponding to the plurality of anomaly types, and wherein the machine learning model is trained using the radio-signal data associated with labels that indicate which type of anomaly is associated with a particular waveform of the radio-signal data;
    generating a report comprising an indication that the anomaly exists and a description of the anomaly type; and
    determining one or more treatments for the determined anomaly.

2. The method of claim 1, further comprising:
    inputting weather data into the machine learning module; and
    determining that the anomaly occurs when the weather data indicates wind above a threshold speed or rainfall above a threshold amount.

3. The method of claim 1, wherein the anomaly type indicates that:
    foliage is blocking a line-of-sight path between the first node and the second node;
    non-foliage is blocking a line-of-sight path between the first node and the second node; or
    a first communication link between the first node and the second node is being interfered with by a second communication link.

4. The method of claim 1, wherein the one or more treatments comprise link adaptation, beam switching, a change of route, or topology modification.

5. The method of claim 1, wherein the one or more features derived from the time series data represent a statistic metric of time series of a path-loss, a signal-to-noise ratio, or a signal-to-interference-noise ratio of the link between the first node and the second node, wherein the statistic metric includes a mean and a standard deviation.

6. The method of claim 1, wherein the one or more features derived from the time series data represent a difference of a statistic metric of time series of a path-loss, a signal-to-noise ratio, or a signal-to-interference-noise ratio of a forward link between the first node and the second node and the respective statistic metric of time series of a reverse link between the second node and the first node, wherein the statistic metric includes a mean and a standard deviation.

7. The method of claim 1, further comprising:
    inputting 3D LIDAR data into the machine-learning module; and
    determining the amount and the location of foliage blockage and non-foliage blockage.

8. One or more computer-readable non-transitory storage media embodying software that is operable when executed to:
    access time series data of a wireless communication link between a first node and a second node on a millimeter-wave communications network;
    determine that an anomaly exists in the time series data;
    deriving one or more features from the time series data, wherein the one or more features includes a first feature that comprises a measure of asymmetry between a first waveform representing a first path loss on a forward link between the first node and the second node and a second waveform representing a second path loss on a reverse link between the second node and the first node;
    determining, without measuring interference along the wireless communication link, an anomaly type for the anomaly by inputting the one or more features derived from the time series data into a machine learning module, wherein the machine learning module, identifies, for a given anomaly, a corresponding anomaly type from a plurality of anomaly types based on one or more radio signal waveform patterns corresponding to the plurality of anomaly types, and wherein the machine learning model is trained using the radio-signal data associated with labels that indicate which type of anomaly is associated with a particular waveform of the radio-signal data; and
    determine one or more treatments for the determined anomaly.

9. The media of claim 8, wherein the software is further operable when executed to:
    input weather data into the machine learning module; and
    determine that the anomaly occurs when the weather data indicates wind above a threshold speed or rainfall above a threshold amount.

10. The media of claim 8, wherein the anomaly type indicates that:
    foliage is blocking a line-of-sight path between the first node and the second node;
    non-foliage is blocking a line-of-sight path between the first node and the second node; or
    a first communication link between the first node and the second node is being interfered with by a second communication link.

11. The media of claim 8, wherein the one or more treatments comprise link adaptation, beam switching, a change of route, or topology modification.

12. The media of claim 8, wherein the one or more features derived from the time series data represent a statistic metric of time series of a path-loss, a signal-to-noise ratio, or a signal-to-interference-noise ratio of the link between the first node and the second node, wherein the statistic metric includes a mean and a standard deviation.

13. The media of claim 8, wherein the one or more features derived from the time series data represent a difference of a statistic metric of time series of a path-loss, a signal-to-noise ratio, or a signal-to-interference-noise ratio of a forward link between the first node and the second node and the respective statistic metric of time series of a reverse link between the second node and the first node, wherein the statistic metric includes a mean and a standard deviation.

14. The media of claim 8, further comprising:
inputting 3D LIDAR data into the machine-learning module; and
determining the amount and the location of foliage blockage and non-foliage blockage.

15. A system comprising:
one or more processors; and
one or more computer-readable non-transitory storage media coupled to one or more of the processors and comprising instructions operable when executed by one or more of the processors to cause the system to:
access time series data of a wireless communication link between a first node and a second node on a millimeter-wave communications network;
determine that an anomaly exists in the time series data;
derive one or more features from the time series data, wherein the one or more features includes a first feature that comprises a measure of asymmetry between a first waveform representing a first path loss on a forward link between the first node and the second node and a second waveform representing a second path loss on a reverse link between the second node and the first node;
determining, without measuring interference along the wireless communication link, an anomaly type for the anomaly by inputting the one or more features derived from the time series data into a machine learning module, wherein the machine learning module, identifies, for a given anomaly, a corresponding anomaly type from a plurality of anomaly types based on one or more radio signal waveform patterns corresponding to the plurality of anomaly types, and wherein the machine learning model is trained using the radio-signal data associated with labels that indicate which type of anomaly is associated with a particular waveform of the radio-signal data;
generating a report comprising an indication that the anomaly exists and a description of the anomaly type; and
determine one or more treatments for the determined anomaly.

16. The system of claim 15, wherein the processors are further operable when executing the instructions to:
input weather data into the machine learning module; and
determine that the anomaly occurs when the weather data indicates wind above a threshold speed or rainfall above a threshold amount.

17. The system of claim 15, wherein the anomaly type indicates that:
foliage is blocking a line-of-sight path between the first node and the second node;
non-foliage is blocking a line-of-sight path between the first node and the second node; or
a first communication link between the first node and the second node is being interfered with by a second communication link.

18. The system of claim 15, wherein the one or more treatments comprise link adaptation, beam switching, a change of route, or topology modification.

19. The system of claim 15, wherein the one or more features derived from the time series data represent a statistic metric of time series of a path-loss, a signal-to-noise ratio, or a signal-to-interference-noise ratio of the link between the first node and the second node, wherein the statistic metric includes a mean and a standard deviation.

20. The system of claim 15, wherein the one or more features derived from the time series data represent a difference of a statistic metric of time series of a path-loss, a signal-to-noise ratio, or a signal-to-interference-noise ratio of a forward link between the first node and the second node and the respective statistic metric of time series of a reverse link between the second node and the first node, wherein the statistic metric includes a mean and a standard deviation.

* * * * *